United States Patent
Witherspoon et al.

(10) Patent No.: US 11,200,881 B2
(45) Date of Patent: Dec. 14, 2021

(54) AUTOMATIC TRANSLATION USING DEEP LEARNING

(71) Applicant: International Business Machines Corporation, Armonk, NY (US)

(72) Inventors: Shonda A. Witherspoon, White Plains, NY (US); Shalisha Witherspoon, White Plains, NY (US); Bong Jun Ko, Harrington Park, NJ (US)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 16/523,507

(22) Filed: Jul. 26, 2019

(65) Prior Publication Data

US 2021/0027761 A1 Jan. 28, 2021

(51) Int. Cl.
*G10H 1/36* (2006.01)
*G10L 13/00* (2006.01)
*G06N 3/08* (2006.01)
*G06N 3/04* (2006.01)
*G06F 40/58* (2020.01)

(52) U.S. Cl.
CPC .............. *G10L 13/00* (2013.01); *G06F 40/58* (2020.01); *G06N 3/0454* (2013.01); *G06N 3/08* (2013.01); *G10H 1/366* (2013.01)

(58) Field of Classification Search
CPC ..................................................... G10H 1/366
See application file for complete search history.

(56) References Cited

U.S. PATENT DOCUMENTS

| | | | | |
|---|---|---|---|---|
| 5,563,358 A | * | 10/1996 | Zimmerman | G09B 15/00 84/454 |
| 10,008,193 B1 | * | 6/2018 | Harvilla | G10H 1/20 |
| 2009/0120269 A1 | * | 5/2009 | Korst | G10H 1/0008 84/609 |
| 2011/0137920 A1 | * | 6/2011 | Cohen | G06Q 30/02 707/748 |

(Continued)

FOREIGN PATENT DOCUMENTS

CN 105786802 A 7/2016
CN 105913845 A 8/2016

(Continued)

OTHER PUBLICATIONS

Girardeau, B., et al., "Poetic Machine Translation", Dec. 13, 2013, 5 pages, https://rajpurkar.github.io/files/GirardeauRajpurkar-PoeticMachineTranslation.pdf.

(Continued)

*Primary Examiner* — Feng-Tzer Tzeng
(74) *Attorney, Agent, or Firm* — Scully, Scott, Murphy & Presser, P.C.; Joseph Petrokaitis

(57) ABSTRACT

Audio data of an original work is received. Text in the audio data is translated to a target language. The audio data is passed to a first deep learning model to learn voice features in the audio data. The audio data is passed to a second deep learning model to learn audio properties in the audio data. The translated text is synchronized to play in the position of original text of the original work in a synthesized voice. A translated audio data of the original work is created by combining the synchronized translated text in the synthesized voice with music of the audio data.

17 Claims, 7 Drawing Sheets

(56) References Cited

U.S. PATENT DOCUMENTS

2012/0290285 A1* 11/2012 Wang ..................... G09B 5/06
704/2

FOREIGN PATENT DOCUMENTS

CN           106328176 A     1/2017
WO      2018217790 A1   11/2018

OTHER PUBLICATIONS

"Beat and tempo" printed on Jul. 23, 2019, 1 page, https://librosa.github.io/librosa/beat.html.
"WaveNet: A Generative Model for Raw Audio", printed on Jul. 23, 2019, 5 pages, https://deepmind.com/blog/wavenet-generative-model-raw-audio/.
NIST, "NIST Cloud Computing Program", http://csrc.nist.gov/groups/SNS/cloud-computing/index.html, Created Dec. 1, 2016, Updated Oct. 6, 2017, 9 pages.

* cited by examiner

AUTOMATIC TRANSLATION USING DEEP LEARNING

BACKGROUND

The present application relates generally to computers and computer applications, and more particularly to translating an original work, such as musical works sung in one language, to another language, which for example, can preserve at least to an extent one or more of cultural connotation, rhythm, meter, tempo, and other features of the original work.

The advance of the Internet and social media technology connects the world more than ever before, and makes it more accessible for individuals to be introduced to, and appreciate different cultures, including for example, music. Currently, however, translations of the lyrics in original works are left to literal translation or robotic readings. Such translations may lack quality, as they may not fully capture various aspects of the original work, for example, cultural connotations, rhythm, tempo and/or other features conveyed when played in the native language of the original work.

BRIEF SUMMARY

A computer-implemented method and system for automatic translation of original work can be provided. The method, in one aspect, may include receiving audio data of an original work. The method may also include translating text in the audio data to a target language. The method may further include passing the audio data to a first deep learning model to learn voice features in the audio data. The method may also include passing the audio data to a second deep learning model to learn audio properties in the audio data. The method may further include synchronizing the translated text to play in the position of original text of the original work in a synthesized voice of the learned voice features. The method may also include creating a translated audio data of the original work by combining the synchronized translated text in the synthesized voice with music of the audio data.

A system, in one aspect, may include a hardware processor. A memory device may be operatively coupled with the hardware processor. The hardware processor may be operable to receive audio data of an original work. The hardware processor may be further operable to translate text in the audio data to a target language. The hardware processor may be further operable to pass the audio data to a first deep learning model to learn voice features in the audio data. The hardware processor may be further operable to pass the audio data to a second deep learning model to learn audio properties in the audio data. The hardware processor may be further operable to synchronize the translated text to play in the position of original text of the original work in a synthesized voice. The hardware processor may be further operable to create a translated audio data of the original work by combining the synchronized translated text in the synthesized voice with music of the audio data.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Systems, methods and techniques may be provided, which can translate lyrics. The translations in various embodiments retain, for example, to an extent, the original lyrics' intent and/or cultural nuances, for example, using machine learning to recognize idioms and expressions, and/or utilizing "urban" or "slang" databases.

In an embodiment, a deep learning methodology provides a text-to-song translation, transforming the way the audio is read back, such that the audio provides singing in the melody, rhythm, and tone (key) of the provided original work (e.g., vocal music or song).

In an embodiment, a deep learning model may be constructed and trained to play audio in, or imitate the vocals of a voice in the audio file. Each part of the song can be sung in the trained vocals. Audio playback with translation can be provided that can play back in the original voice, to an extent, of the audio file. With the translated audio playback, listeners can have a better understanding of music from countries around the world, and can appreciate the music on a wider-scale. Such audio or song translator can be provided with a permission of appropriate party or parties.

Figure 1:
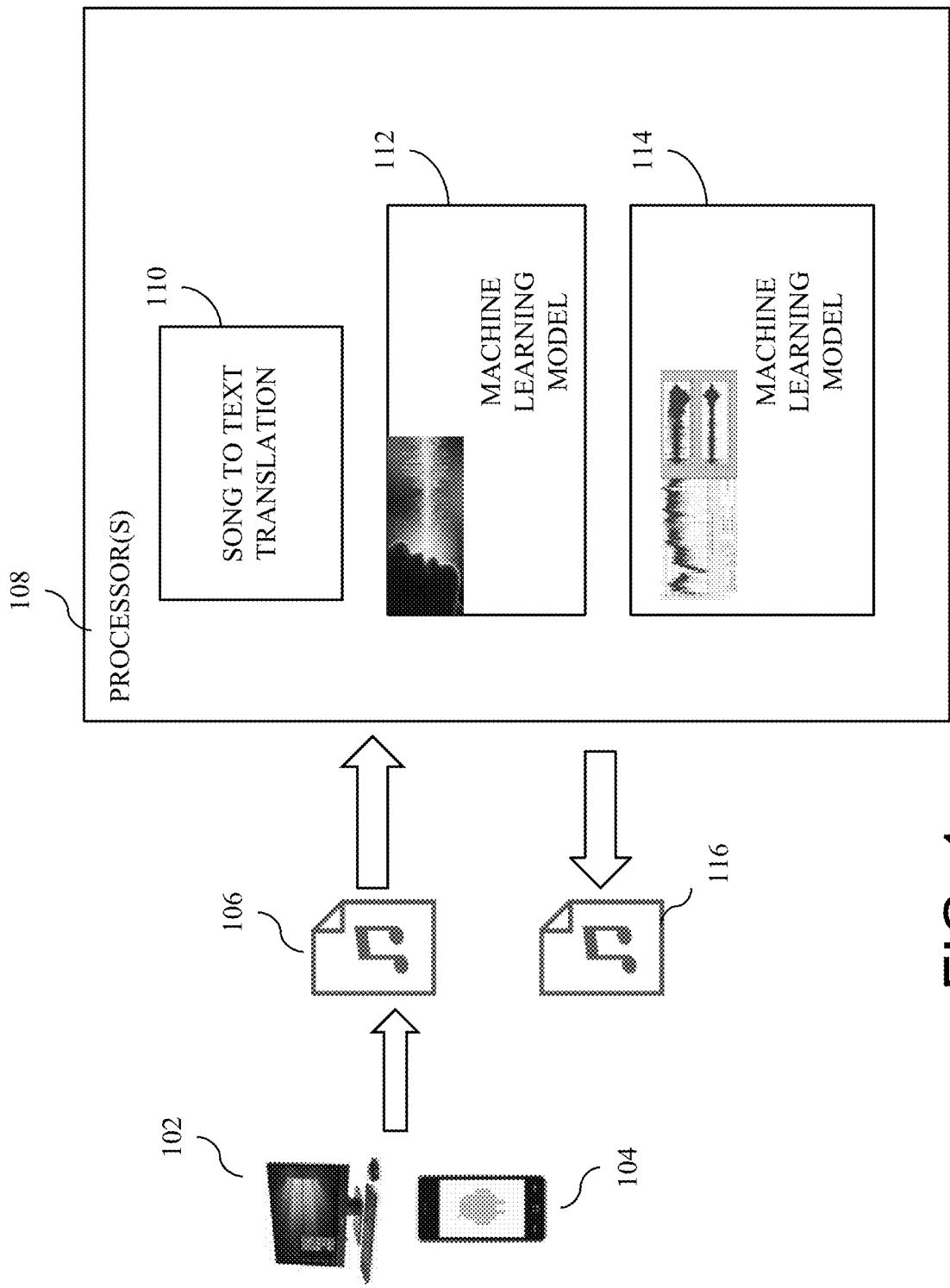
FIG. 1 is a diagram illustrating system architecture in one embodiment.

FIG. 1 is a diagram illustrating system architecture in one embodiment. The components shown include computer-implemented components, for instance, implemented and/or run on one or more hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

In an embodiment, machine learning such as a deep learning methodology can be implemented to build and/or train one or more machine learning models (e.g., deep learning models), and/or run the trained machine learning models (e.g., deep learning models). A deep learning model is an artificial neural network model, also referred to as a neural network model. An embodiment of an implementation of an artificial neural network can include a succession of layers of neurons, which are interconnected so that output signals of neurons in one layer are weighted and transmitted to neurons in the next layer. A neuron Ni in a given layer may be connected to one or more neurons Nj in the next layer, and different weights wij can be associated with each neuron-neuron connection Ni-Nj for weighting signals transmitted from Ni to Nj. A neuron Nj generates output signals dependent on its accumulated inputs, and weighted signals can be propagated over successive layers of the network from an input to an output neuron layer. An artificial neural network machine learning model can undergo a training phase in which the sets of weights associated with respective neuron layers are determined. The network is exposed to a set of training data, in an iterative training scheme in which the weights are repeatedly updated as the network "learns" from the training data. The resulting trained model, with weights defined via the training operation, can be applied to perform a task based on new data.

In an embodiment, a computer executable application such as a web application and/or a mobile application (app) can be provided that allows a user to upload an audio file to a computer system for translation. The web application and/or mobile app can include a user interface such as a graphical user interface (GUI) for interacting with a user device, e.g., 102, 104, for example, receiving input from and providing output to one or more user devices.

A processor 108, for example, a computer system, receives the audio file 106 and converts the audio file to text, for example, using one or more song-to-text services. For instance, a song-to-text translation component or program instructions 110, which can be executed on or by the processor 108, can convert the audio file of a song into text corresponding to the lyrics of the song. The text of the audio file (e.g., uploaded file) can be translated into target language. Natural language processing techniques can be used for language translation. For example, the text (converted text) is passed through a translation service, which takes steps to preserve cultural connotation, for example, by mining an urban dictionary or another like dictionary and document embedding to map to similar expressions in the target language. The text can also be passed to a machine learning model (e.g., a neural network model) trained to recognize newly encountered idioms and expressions. For instance, the translation is refined based on preserving cultural nuance, rhyming scheme and syllable count.

The audio file 106 is processed through deep learning (e.g., a machine learning method based on artificial neural network), which learns (e.g., classifies or identifies using a trained deep learning model) the different vocals featured in the audio file (e.g., a song represented in the audio file) to create one or more voice models used to synthesize the original vocalist in the audio file for text-to-song translation. For example, the audio file is passed through a deep learning model 112 to classify or determine voices contained in the uploaded audio file. A model can be created for each recognized voice in the uploaded audio file for voice synthesis. For example, a model can be created for each voice identified during the learning phase. If the audio file has one voice or vocalist singing a song, one voice model is created. For example, audio properties of a voice signal can be captured and modeled for voice synthesis.

A voice model corresponds to a trained deep learning model 112, which can be used to learn/identify the distinct voices present in the uploaded audio file. Using the signature learned from each vocal, the processor 108 can use the voice model to have the translated song played back in the "original" vocals.

By way of example, a voice model can be created in two steps. In the first step, one or more processors can process an audio file to separate vocals from any instrumentation, for example, using one or more various known existing techniques. For example, one or more processors can train a deep learning model with a training data set, in which the input data can be the spectrogram of the audio file containing both the vocals and the accompanying musical instruments, and the output data can be the masks in the spectrogram that represent only the vocals of the audio. In the second step, one or more processors can use the vocal parts in the audio file (or the corresponding spectrogram) to train a generative model of a new singing voice with different lyrics. For example, one or more processors can use or implement a generative adversarial network (GAN) to synthesize a singing voice that mimics the original singing voice, in which the original voice is used as a reference output of the GAN and the input is the musical notes and lyrics that are sung by the generative voice.

The audio file 106 is processed through another machine learning service 114 that learns (e.g., classifies or identifies using a trained machine learning model, for example, a trained deep learning model) the timing, rhythm, and notes of the song represented in the audio file, to transform the translated text (e.g., translated lyrics that preserve at least some of the connotations of the original language) into a song (e.g., perform text-to-song translation). For instance, a machine learning model 114 such as a deep learning model can be trained to classify, identify and/or predict properties in an audio file of a song, the properties including tone/pitch rhythm and timing of lyrics. By way of example, a deep learning model, such as convolutional neural network (CNN) or recurrent neural network (RNN), can be trained with a training dataset that includes input-output data pairs, where input data can be in the form of spectral domain representation, e.g., Fast Fourier Transform (FFT), Short-Time Fourier Transform (STFT), of an audio file, and the output data is a vector representing tone, pitch, rhythm, and the timing of notes corresponding to the audio data in the input. A machine learning model in this way can be later used to generate the corresponding output (e.g., tone, pitch, rhythm, and timing) given an audio file in the inference time.

A translated song 116 can be created by synchronizing the synthesized voice singing (e.g., output from 112 and 114) the translated lyrics (e.g., output from 110) to where the lyrics were positioned in the original song, and overlaying the translated lyrics on top of the music. For example, using the time intervals found for each vocalist, one or more processors may input the translated text to a text-to-speech service that can use the voice model of the vocalist identified for the appropriate time interval of the song as the synthesized voice, thereby recreating the song (dubbed text-to-song).

The translated song 116 can be available, for example, to download as an audio file, for example, to a user device 102, 104. In another aspect, the translation processing may be performed by a user device, e.g., 102, 104, in which case an audio file need not be uploaded and downloaded.

In an embodiment, a user interface (UI) such as a graphical user interface (GUI) may be provided which can interact with a user and receive input from the user for computer processing. For instance, there can be a number of factors, which can be taken into consideration in determining the "quality" of the lyrical translation of a song represented in an audio file. By way of example, the factors can include cultural or local connotation retention; syllable count; and rhyming scheme. The user interface can allow the user to adjust those factors in order to produce a song recreation or translation that satisfies the user (e.g., requester or listener) or meets the user's preference.

In an embodiment, for syllable count and rhyming scheme preference, additional natural language processing (NLP) may be utilized on top of the produced translation.

Figure 2:
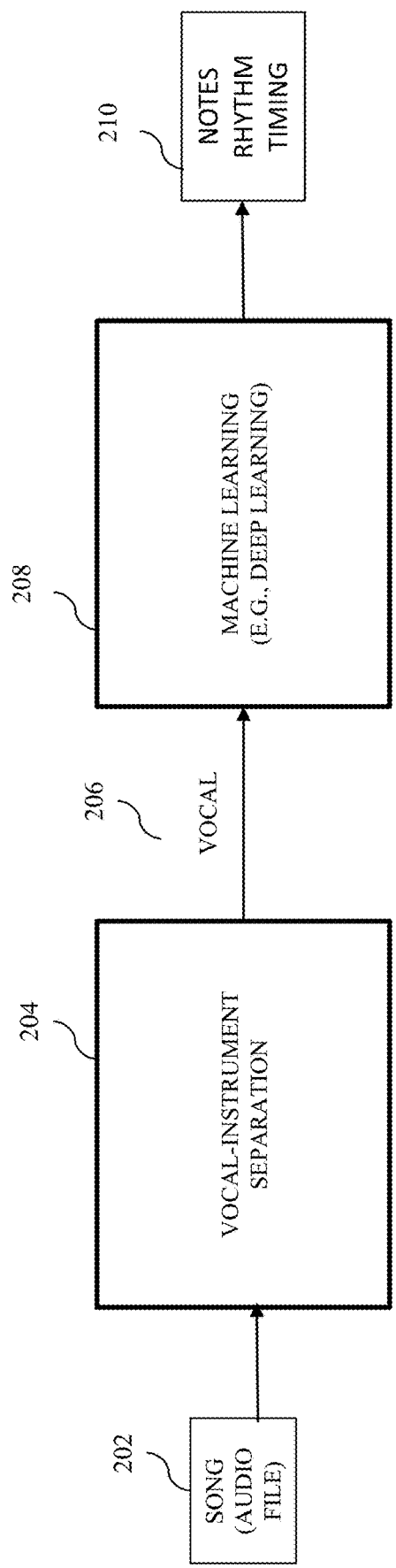
FIG. 2 is a block diagram illustrating audio file conversion in one embodiment.

In an embodiment, an audio file of a song can be converted into the following components: lyric (text); notes of the song (pitch, length, and timing); and rhymes. For instance, a deep learning model may be trained to convert an input audio file into those components. FIG. 2 is a block diagram illustrating audio file conversion in one embodiment. For example, the song-to-text translation shown at 110 in FIG. 1 can perform the conversion. An audio file is input to a vocal-instrument separation component 204 that separates or filters vocal data from instrument data in the audio file. A known technique, for example, can be used in this instrument separation component 204 to filter vocal data 206. The vocal data 206 is input to a deep learning model 208, which separates the vocal data 206 into notes, rhythm, and timing 210. In an embodiment, the deep learning model 208 is an artificial neural network machine learning model trained to identify notes, rhythm, and timing from input vocal data features. The deep learning model 208 can be a deep learning model described in FIG. 1, 114, which learns the musicality of the song for synthesizing, for example, to determine how the song was sung (e.g., tone, pitch, key), how long notes were held, and rhythm.

Figure 3:
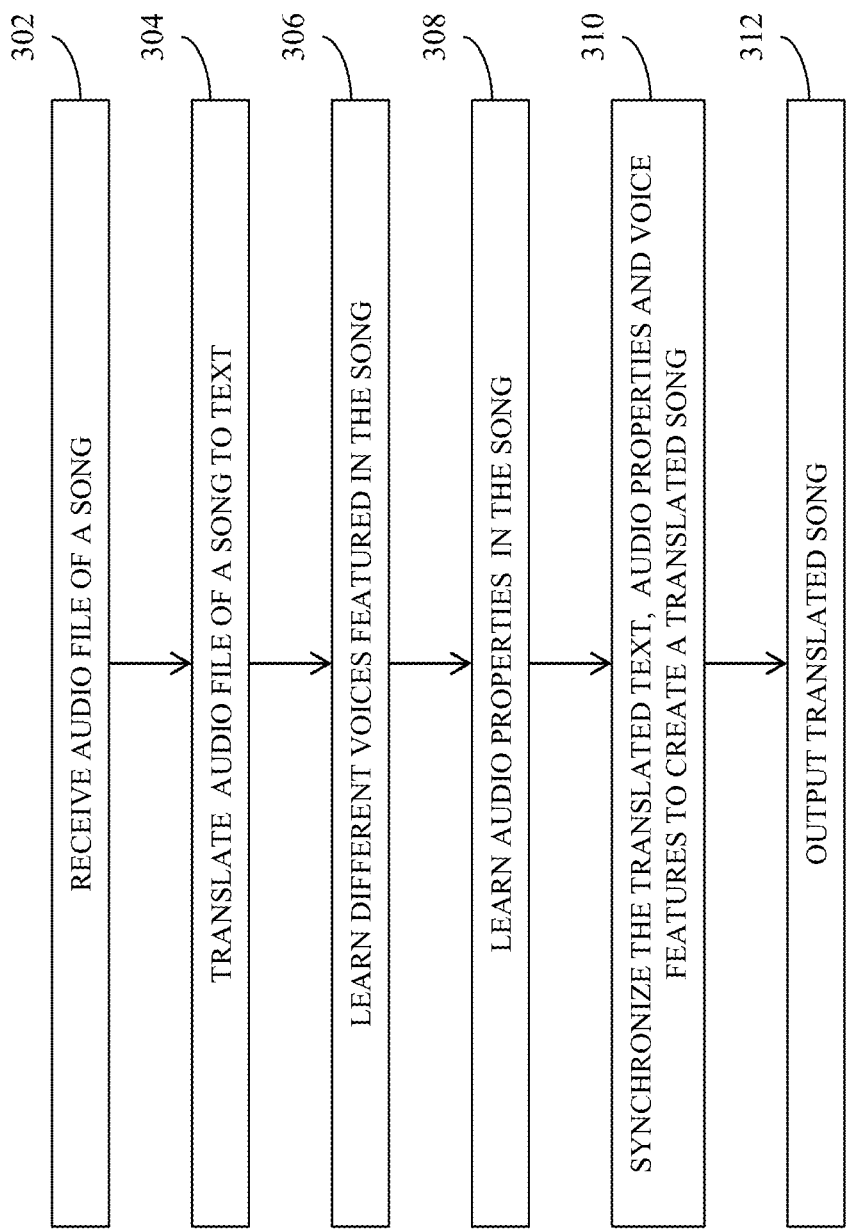
FIG. 3 is a flow diagram illustrating a method in one embodiment.

FIG. 3 is a flow diagram illustrating a method in one embodiment. At 302, audio data (e.g., an audio file) of a song is received. A target language into which to translate the song can also be received. At 304, the audio file is translated to text. The text conversion can be performed which may preserve cultural, local and/or other connotations conveyed in the lyrics of the received song. For example, the translation can include data processing of the terms or text in the received song, for example, searching and analyzing data in one or more databases such as an urban dictionary and performing document embedding to map to similar expressions in the target language, for instance, to preserve local meaning and/or connotations conveyed in the original term or text. In addition, machine learning can be used to recognize newly encountered idioms and expressions. The translation preserves at least some of the original connotations and/or factors expressed in the song.

The translation (also referred to as a lyrical translation) can take into consideration cultural or local connotation retention, syllable count and rhyming scheme. For instance, those factors can be preserved in the translation from original to target language. In an embodiment, the translated lyrics can be adjusted so that it follows a rhyming and/or melodic pattern, while iteratively seeking to retain the meaning of the lyrics.

In an embodiment, which aspects of the original lyric or text are to be preserved or preserved to an extent in the translation can be configured and/or adjusted. For instance, a user can specify and/or adjust the factors and scale the factors.

For instance, a user via a user interface on a user device may input such specification. A GUI, for example, can allow a user to scale the balance of retaining cultural connotations versus having a more appealing translation that takes rhyming or the number of syllables into account, which may consequently lose some of the original intent in the process. In an embodiment, N number of translations can be made or generated, for example, translated with differently adjusted factors. A user may be allowed to request via a user interface, to keep N number of translations and the user may select a version which the user may prefer. The method may also include learning a user's preference or preferences of factor settings in lyrical translations, for example, the adjustment of the factors considered for translation.

At 306, a first machine learning model, e.g., a deep learning model learns (e.g., classifies or determines) a voice feature in the audio file. Voice models learned from audio files can be saved for re-use.

At 308, a second machine learning model, e.g., a deep learning model learns (e.g., classifies or determines) audio properties in the audio file. Audio properties may include, but not limited to, tone, pitch, rhythm, and timing of lyrics. For instance, the deep learning model can be a classification model, trained based on data which include audio files or songs with different tone, pitch, rhythm, and timing. The deep learning model can be trained to classify or identify different tone, pitch, rhythm, and timing in a given audio file of a song. By way of example, a deep learning model, such as convolutional neural network (CNN) or recurrent neural network (RNN), can be trained with a training dataset that includes input-output data pairs, where input data can be in the form of spectral domain representation, e.g., Fast Fourier Transform (FFT), Short-Time Fourier Transform (STFT), of an audio file, and the output data is a vector representing tone, pitch, rhythm, and the timing of notes corresponding to the audio data in the input. A machine learning model in this way can be later used to generate the corresponding output (e.g., tone, pitch, rhythm, and timing) given an audio file in the inference time.

At 310, the translated text, the audio properties and voice features (e.g., identified via the deep learning models) are synchronized to create a translated song. For instance, the translated lyrics can be synchronized to play where the original lyrics were positioned, and sung by a synthesized voice (voice features or voice model). The synchronized voice and lyrics can be overplayed on top of the music, for example, instrumental component of the audio file, to create the translated song.

At 312, the translated song can be output. For instance, the translated song can be stored in a memory or storage device and made available for transmitting or downloading to a user device or another player device.

Figure 4:
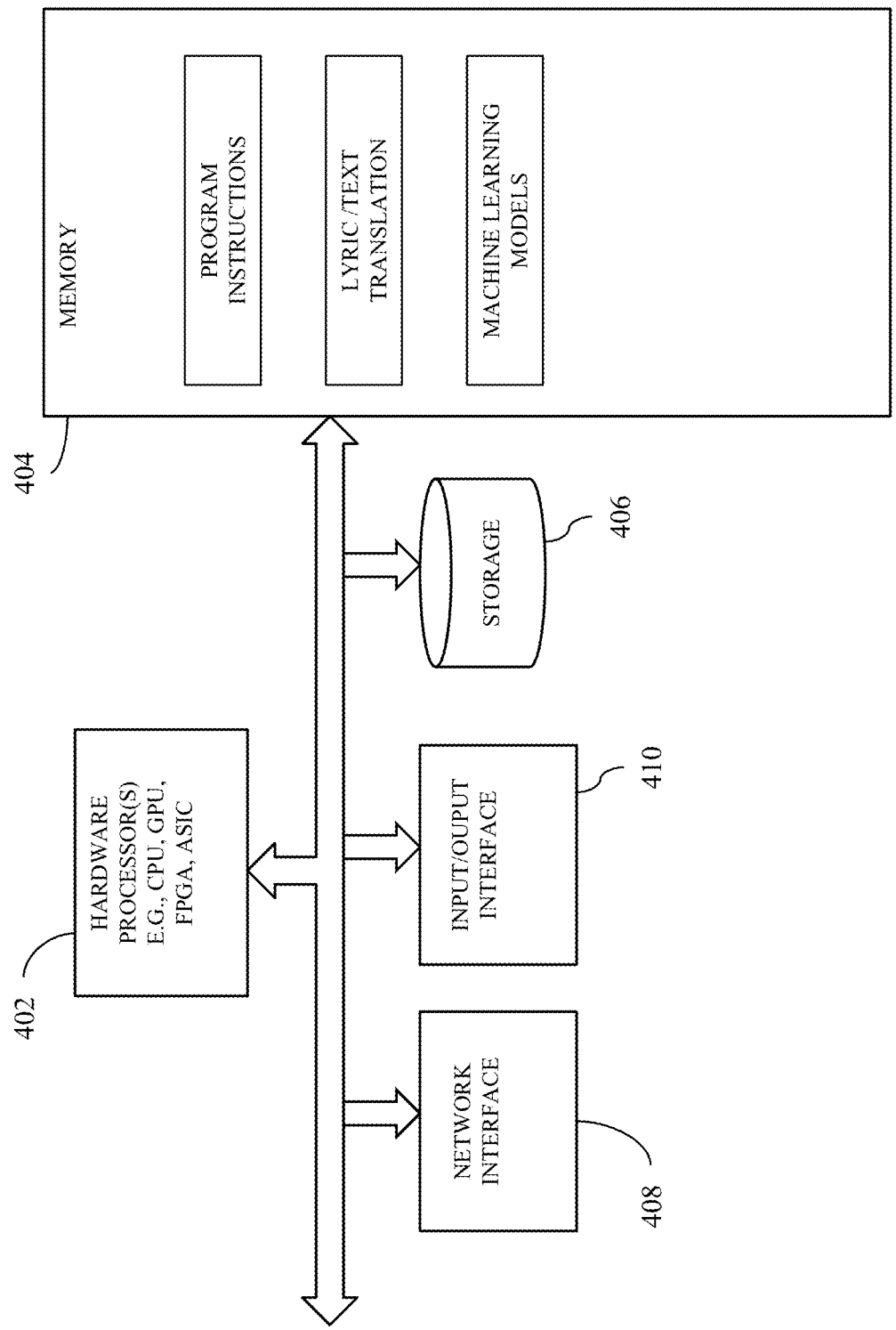
FIG. 4 is a diagram showing components of a system in one embodiment that can perform a translation of an audio file of original work.

FIG. 4 is a diagram showing components of a system in one embodiment that can perform a translation of an audio file of original work such as a song. One or more hardware processors 402 such as a central processing unit (CPU), a graphic process unit (GPU), and/or a Field Programmable Gate Array (FPGA), an application specific integrated circuit (ASIC), and/or another processor, may be coupled with a memory device 404, and generate a translated audio file of a song (e.g., an audio file of a song translated into a target language different from the language of the received audio file) given an audio file of a song. A memory device 404 may include random access memory (RAM), read-only memory (ROM) or another memory device, and may store data and/or processor instructions for implementing various functionalities associated with the methods and/or systems described herein. One or more processors 402 may execute computer instructions stored in memory 404 or received from another computer device or medium. A memory device 404 may, for example, store instructions and/or data for functioning of one or more hardware processors 402, and may include an operating system and other program of instructions and/or data. One or more hardware processors 402 may receive input audio data or file of a song, for example, sung in a language (also referred to as a first language for explanation sake). At least one hardware processor 402 may generate an audio data or file of a song that is sung in another language (also referred to as a second language or a target language for explanation sake) as described above, for example, using techniques such as natural language processing, artificial neural networks (e.g., deep learning) and/or other technique. In one aspect, training data for training deep learning models can be stored on a storage device 406 or received via a network interface 408 from a remote device, and may be temporarily loaded into a memory device 404 for building or generating the deep learning models. The trained models can be stored on a memory device 404, for example, for execution by one or more hardware processors 402 and/or stored on a storage device 406. One or more hardware processors 402 may be coupled with interface devices such as a network interface 408 for communicating with remote systems, for example, via a network, and an input/output interface 410 for communicating with input and/or output devices such as a keyboard, mouse, display, and/or others.

In an embodiment, the translation can address musicality when offering an appropriate translation, which can entail rhythm, beat/timing, and balance between quality translation, cultural or local or locality preservation, syllable count, rhyming scheme. In an embodiment, a methodology may consider modeling a voice of an individual to learn to sing a specific song, which can have varying factors such as, but not limited to, pitch, octave, length of the notes, note-to-note transition (e.g., from low to high, high-to-low) and number of vocalist featured. The methodology in an embodiment can account for these factors by learning the musical elements of a given song and modeling a voice or voices to sing or rap in the same manner as the song provided.

Figure 5:
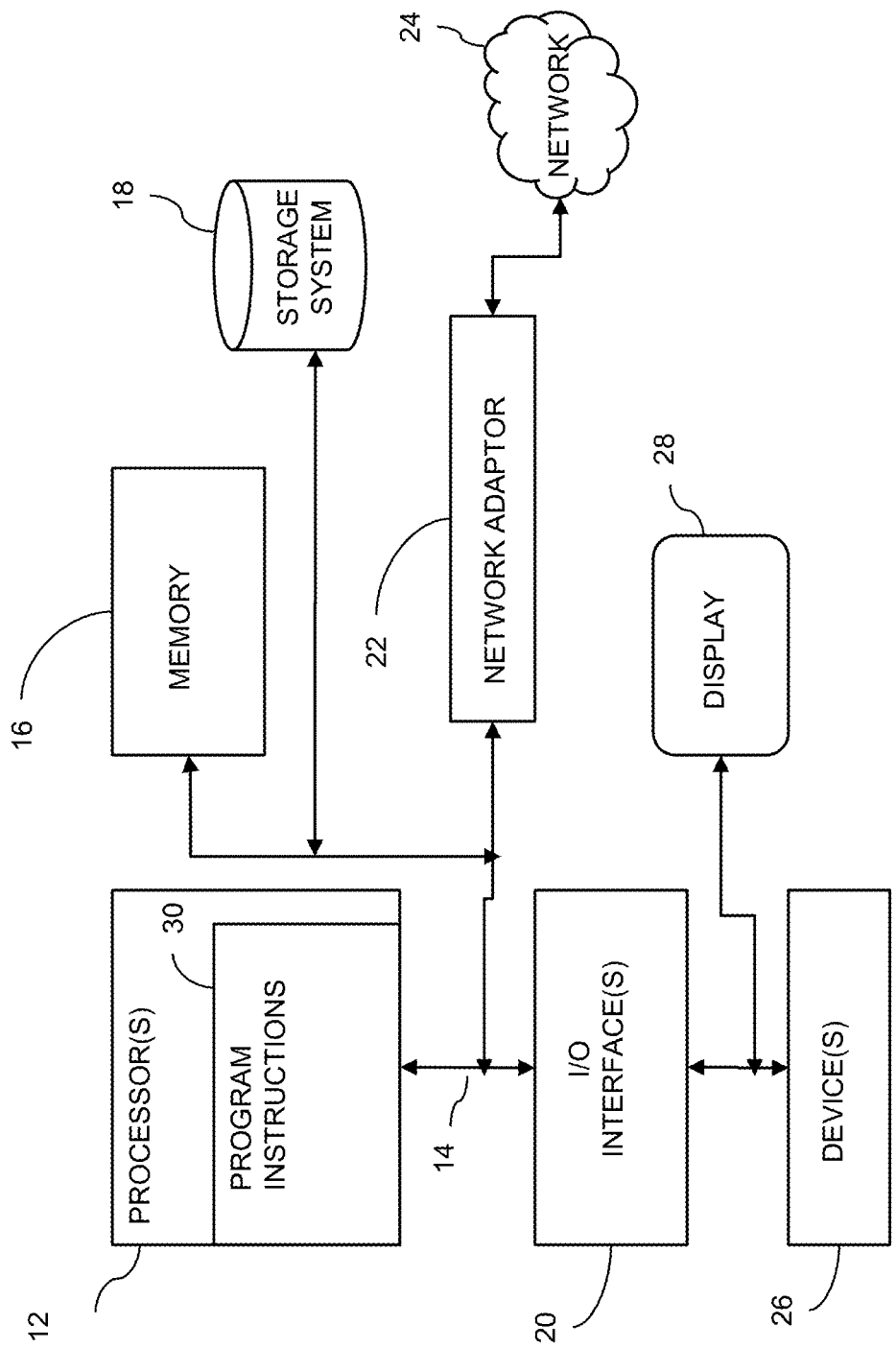
FIG. 5 illustrates a schematic of an example computer or processing system that may implement a translation system in one embodiment of the present disclosure.

FIG. 5 illustrates a schematic of an example computer or processing system that may implement a translation system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
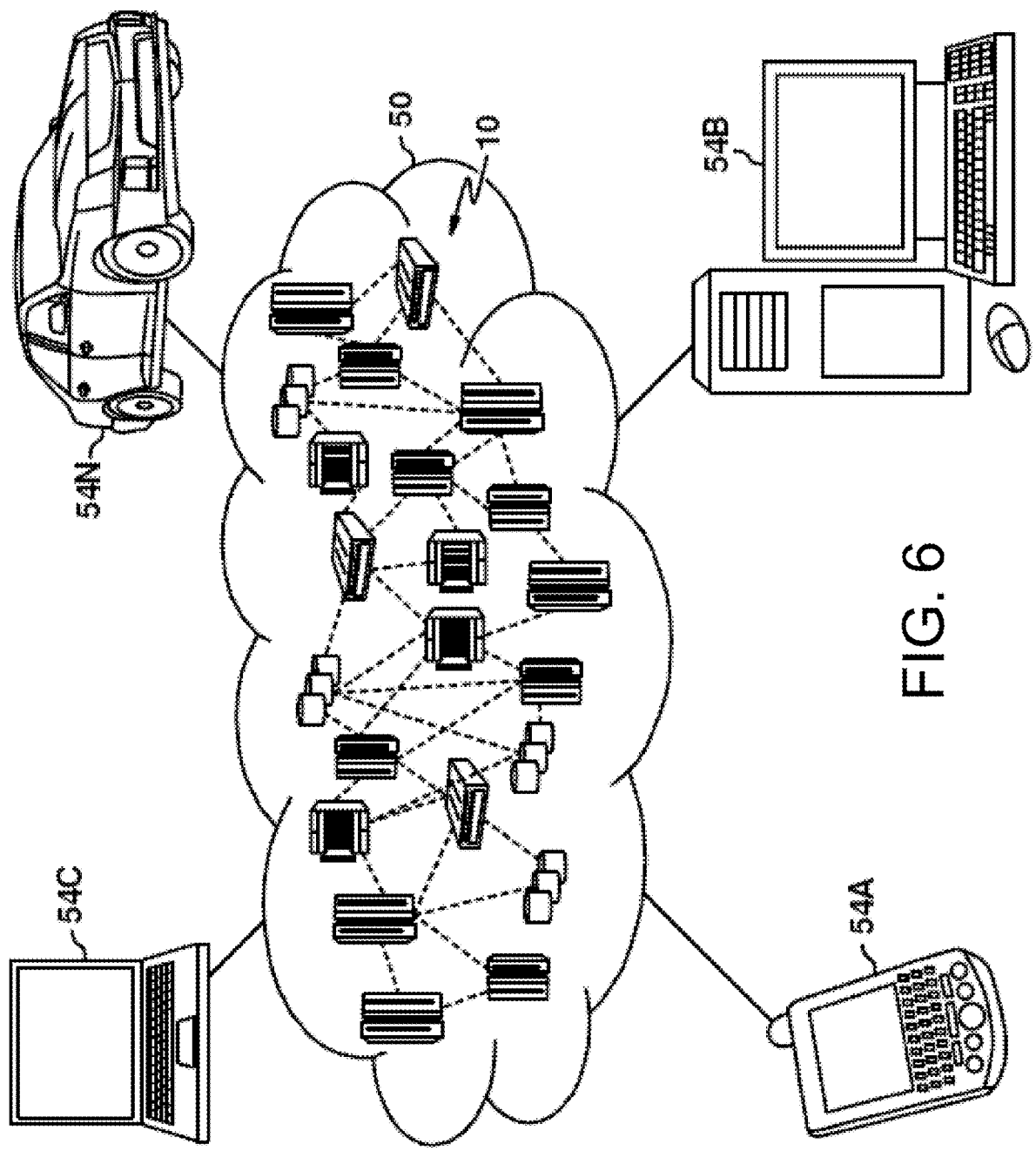
FIG. 6 illustrates a cloud computing environment in one embodiment.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
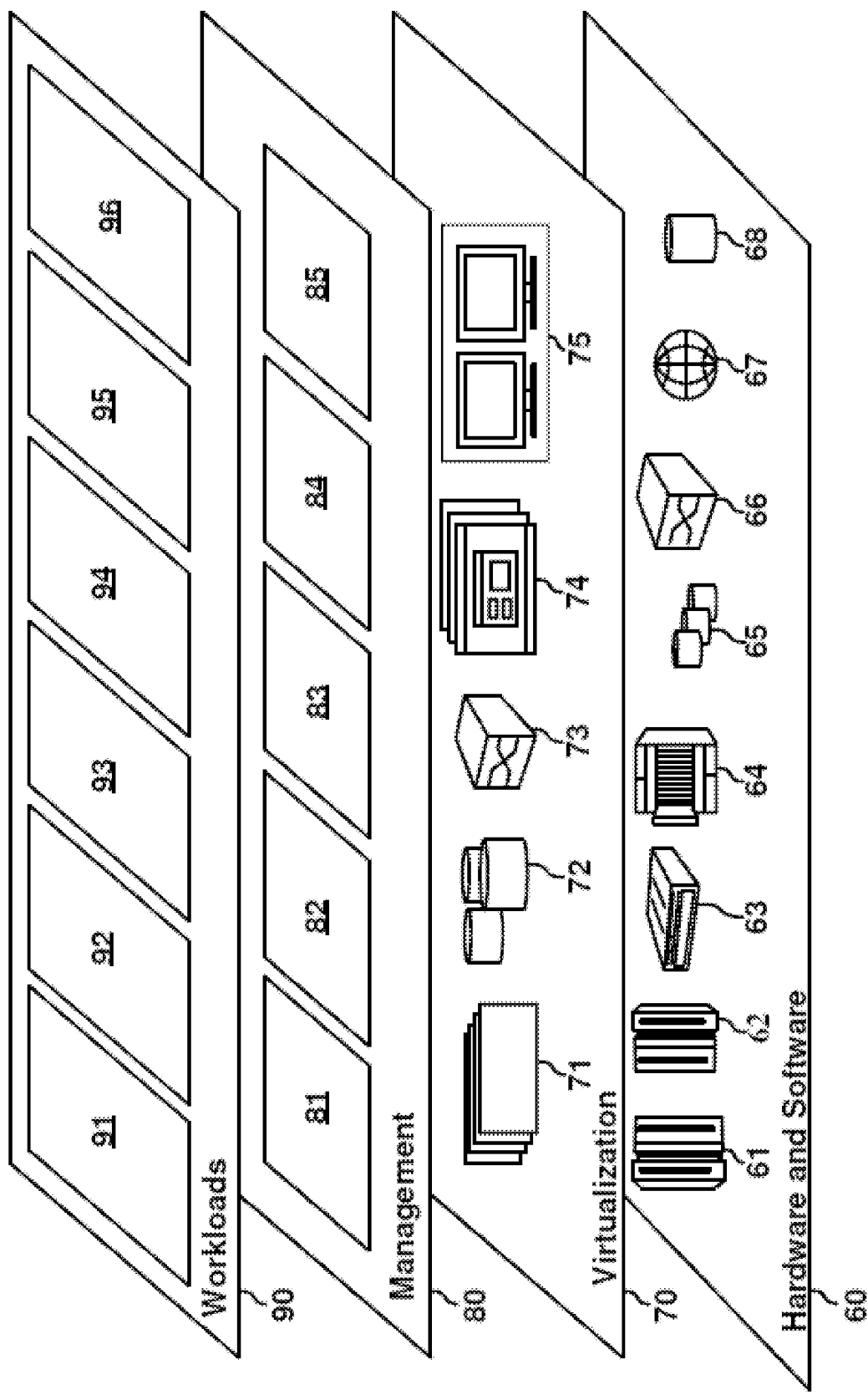
FIG. 7 illustrates a set of functional abstraction layers provided by cloud computing environment in one embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and original work translation processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method comprising:
receiving audio data of an original work;
translating text in the audio data to a target language;
passing the audio data to a first deep learning model to learn voice features in the audio data;
passing the audio data to a second deep learning model to learn audio properties in the audio data;
synchronizing the translated text to play in the position of original text of the original work in a synthesized voice of the learned voice features; and
creating a translated audio data of the original work by combining the synchronized translated text in the synthesized voice with music of the audio data,
wherein the translating the text takes into account local connotation retention, syllable count, and rhyming scheme.

2. The method of claim 1, further comprising:
separating the audio data into vocal and music portion, wherein the vocal portion is passed to the second deep learning model to learn audio properties, the audio properties including at least lyrics, notes and rhythm.

3. The method of claim 2, wherein the translating text in the audio data to a target language comprises translating the lyrics to the target language.

4. The method of claim 1, further comprising configuring at least one of the local connotation retention, syllable count and rhyming scheme to be considered more dominantly in the translating.

5. The method of claim 4, wherein the configuring is performed based on user input.

6. The method of claim 5, further comprising learning a user preference based on the user input.

7. A system comprising:
a hardware processor;
a memory device operatively coupled with the hardware processor;
the hardware processor operable to:
receive audio data of an original work;
translate text in the audio data to a target language;
pass the audio data to a first deep learning model to learn voice features in the audio data;
pass the audio data to a second deep learning model to learn audio properties in the audio data;
synchronize the translated text to play in the position of original text of the original work in a synthesized voice; and
create a translated audio data of the original work by combining the synchronized translated text in the synthesized voice with music of the audio data,
wherein the hardware processor is operable to take into account at least local connotation retention, syllable count, and rhyming scheme in translating the text.

8. The system of claim 7, wherein the hardware processor is further operable to separate the audio data into vocal and music portion, wherein the vocal portion is passed to the second deep learning model to learn audio properties, the audio properties including at least lyrics, notes and rhythm.

9. The system of claim 8, wherein the text includes the lyrics.

10. The system of claim 7, wherein the hardware processor is further operable to configure at least one of the local connotation retention, syllable count and rhyming scheme to be considered more dominantly in the translating.

11. The system of claim 7, wherein the synthesized voice is a synthesized voice of a selected singer.

12. The system of claim 7, wherein the synthesized voice is a synthesized voice of the learned voice features from the audio file.

13. A computer program product comprising a computer readable storage medium having program instructions embodied therewith, the program instructions executable by a device to cause the device to:
receive audio data of an original work;
translate text in the audio data to a target language;
pass the audio data to a first deep learning model to learn voice features in the audio data;
pass the audio data to a second deep learning model to learn audio properties in the audio data;
synchronize the translated text to play in the position of original text of the original work in a synthesized voice; and
create a translated audio data of the original work by combining the synchronized translated text in the synthesized voice with music of the audio data,
wherein the device is further caused to take into account at least local connotation retention, syllable count, and rhyming scheme in the received audio data of the original work in translating the text.

14. The computer program product of claim 13, wherein the device is further caused to separate the audio data into vocal and music portion, wherein the vocal portion is passed to the second deep learning model to learn audio properties, the audio properties including at least lyrics, notes and rhythm.

15. The computer program product of claim 14, wherein the text includes the lyrics.

16. The computer program product of claim 13, wherein the device is further caused to configure at least one of the local connotation retention, syllable count and rhyming scheme to be considered more dominantly in the translating.

17. The computer program product of claim 16, wherein the device is further caused to configure at least one of the local connotation retention, syllable count and rhyming scheme to be considered more dominantly in the translating based on user input.

* * * * *